Dec. 24, 1968  S. B. DALE  3,417,422
BALL CASTORS

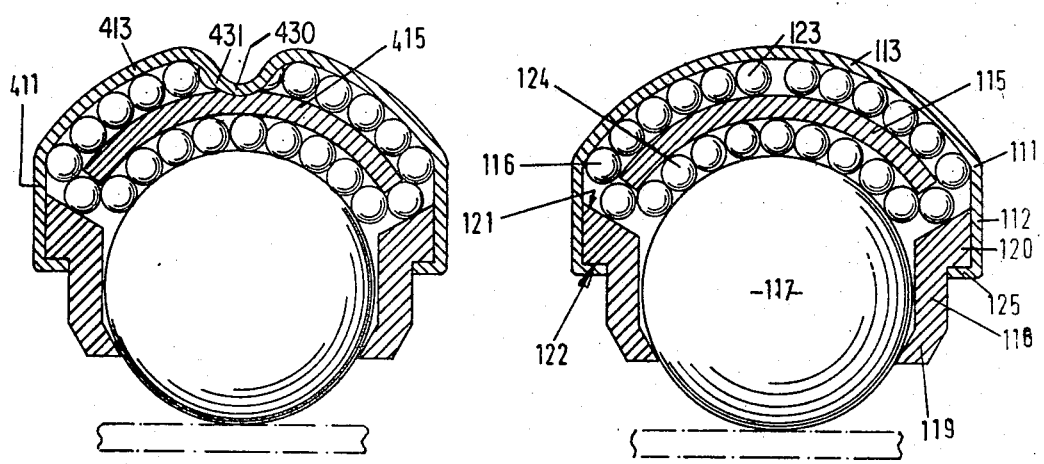
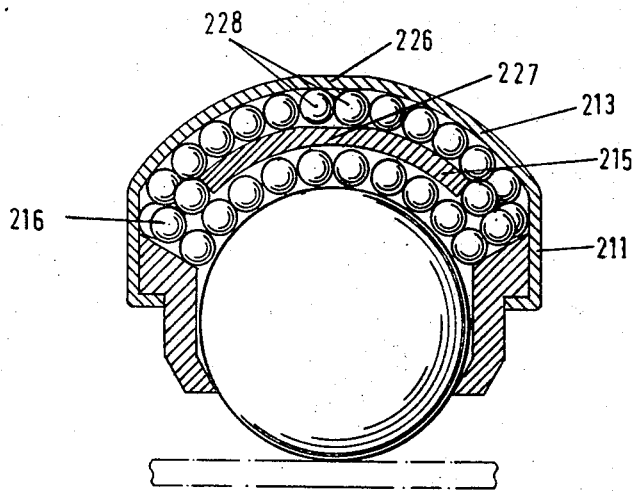
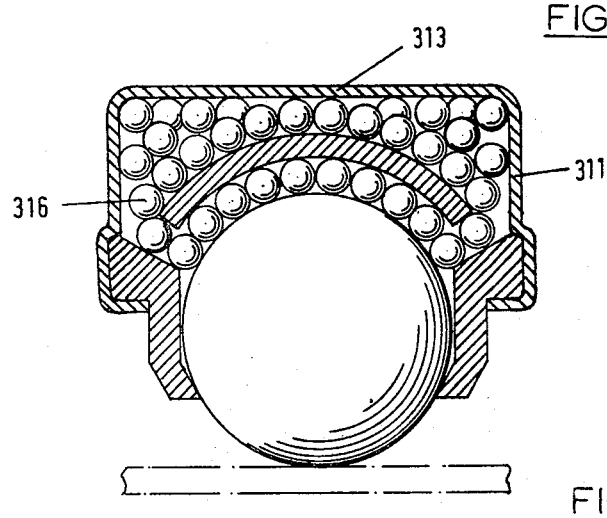

Filed Aug. 16, 1966  2 Sheets-Sheet 2

INVENTOR:
SAMUEL PERCY BRADLEY DALE
BY Kurt Kelman
AGENT

United States Patent Office 3,417,422
Patented Dec. 24, 1968

3,417,422
BALL CASTORS
Samuel B. Dale, Sheldon, Birmingham, England, assignor to Autoset (Production) Limited, Birmingham, England, a British company
Filed Aug. 16, 1966, Ser. No. 572,820
Claims priority, application Great Britain, Mar. 5, 1966, 9,761/66
4 Claims. (Cl. 16—26)

ABSTRACT OF THE DISCLOSURE

A ball castor having a main ball retained in a cup-shaped housing, a multiplicity of bearing balls of a diameter smaller than that of the main ball, the bearing balls being disposed in a circulating chamber between the main ball and the base of the housing, and a freely floating table in the circulating chamber dividing the bearing balls into two layers, the table being of smaller area than the interior of the housing and circumferentially spaced therefrom a distance at least equal to the diameter of the bearing balls to permit free circulation thereof from one to the other layer.

The present invention relates to a ball castor.

Ball castors of this type comprise a cup-shaped housing having a base, a main ball for engaging the ground or another surface received and retained in the housing, a multiplicity of bearing balls of a diameter smaller than that of the main ball, and a freely floating table dividing the bearing balls into two layers. The bearing balls are arranged in a circulating chamber defined by the main ball and the housing base, and the table is of a smaller area than the interior of the housing and circumferentially spaced therefrom a distance at least equal to the diameter of the bearing balls to permit free circulation thereof from one to the other layer.

The above and other features will be more clearly understood in connection with the following description of five embodiments thereof described with reference to the accompanying drawings, wherein:

FIGURE 1 is a sectional elevation of a first embodiment.

FIGURE 2 is a sectional elevation of a second embodiment.

FIGURE 3 is a sectional elevation of a third embodiment.

FIGURE 4 is a sectional elevation of a fourth embodiment.

Figure 5:
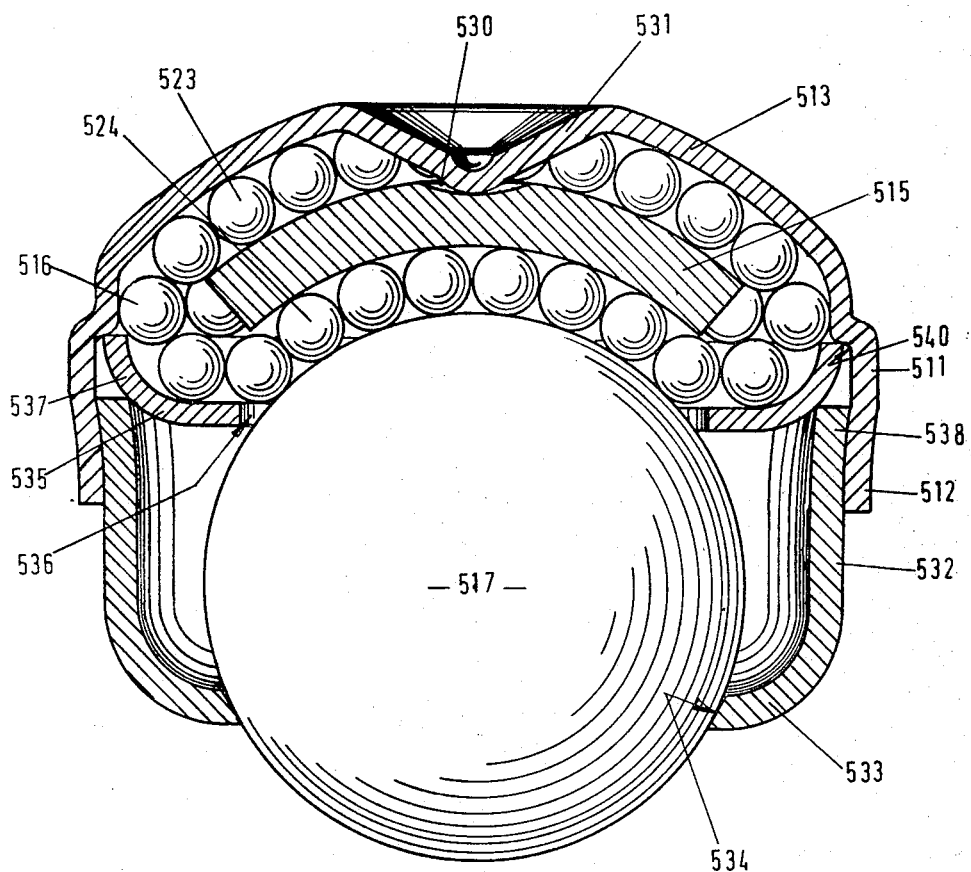
FIGURE 5 is a sectional elevation of a fifth embodiment.

Equivalent parts in respective figures are given the same two-digit reference numerals and all the reference numerals are prefixed by the number of the respective figures.

A first embodiment of the invention is now described with reference to FIGURE 1 wherein there is shown a ball castor comprising a cup-shaped housing 111 which may be a moulding or a pressing, or may be drawn from sheet metal. The housing 111 has a cylindical wall portion 112 unitary with a spherical base 113.

A table 115 is a part-spherical disc with concave and convex opposite surfaces and is made as a pressing from sheet metal of sufficient thickness to prevent deformation in use. The table 115 is preferably hardened to further reduce the likelihood of deformation.

The ball-castor further comprises several bearing balls 116, a larger diameter main ball 117 and a sleeve 118 which serves to maintain the main ball 117 in the housing 111 when the ball-castor is assembled.

The sleeve 18 has an outwardly directed rim 120 at one end, the rim 120 forming an abutment surface 121 which serves to maintain the bearing balls 116 in position, and a shoulder 122 for engaging with the housing. The opposite end of the sleeve 118 is displaced inwardly to form a flange 119.

In assembly some of the bearing balls 116 are loaded into the housing 111 and the table 115 is then placed on these balls. Further bearing balls are then loaded into the housing followed by the main ball 117 and the sleeve 118 which is secured therein. The main ball 117 is rotated and this automatically distributes the bearing ball, centers the table 115 and results in the FIGURE 1 configuration, wherein the table divides the bearing balls into an upper layer 123 between the table and the housing 111 and a lower layer 124 between the table and the main ball 117 and abutment surface 121, which together with the main ball serves to form a lower defining wall of the bearing wall circulating chamber. The bearing balls can thereby circulate from the lower layer 124 to the upper layer 123 with rotation of the main ball 117.

The main ball 117 seats on inwardly directed flange 119 of the sleeve 118 and the sleeve is rendered captive in the housing 111 by inward deformation of the rim 125 of the cylindrical portion 112 of the housing into abutment with shoulder 122 of the sleeve 118.

By permitting the table 115 to be freely floating, accurate machining of the ball-castor parts is obviated since the table 115 will automatically adjust itself to a position that allows free circulation of the bearing balls. Manufacturing tolerances are thereby considerably increased over known constructions so that it is now possible to make both the housing 111 and the table 115 as metal pressings.

Further, no part of the ball-castor is liable to break or be deformed under heavy loading, since the position of the table will automatically be adjusted to support the load.

In a second embodiment of the invention, as shown in FIGURE 2, the ball-castor is a modification of the construction shown in FIGURE 1, in that a flat 226 is formed centrally of the spherical base 213 of the housing 211 and a corresponding flat 227 is formed centrally of table 213 so that a few 228 of the bearing balls 216 (for example three such balls) may be located between the flats and permanently retained there whilst the remainder of the balls circulate.

Interaction between the flats 226, 227 via the trapped balls 228 serves to prevent excessive drifting of the table 215 relative to the housing 211, while still permitting free floating of the table 215 with the attendant advantages related with respect to the first described embodiment.

In a third embodiment as shown in FIGURE 3, the ball-castor is constructed substantially the same as shown in FIGURE 1 except that the base 313 is flat instead of part-spherical. More bearing balls 316 are consequently required, but the housing 311 is simplified so that tool costs may be reduced.

In a fourth embodiment as shown in FIGURE 4, the ball-castor construction is again substantially the same as shown in FIGURE 1, with the modification that a depression 430 is formed centrally of the table 415 and a corresponding depression is formed centrally of the part-spherical base 413 of the housing 411, forming a dimple 431 extending into the housing 411 interior. The dimple 431 seats in the depression 430 of the table 415 to locate the table 415 so as to prevent excessive drifting of the latter while permitting both rocking and lateral movement of the table.

In a fifth embodiment as shown in FIGURE 5, the ball-castor is constructed substantially the same as shown in FIGURE 4 except that manufacture of individual parts is further simplified to reduce costs.

The housing 511 consists of a metal pressing of cup shape having a cylindrical part 512 and a base 513. The base 513 is formed with a dimple 531 and the cylindrical part 512 is formed with an internal annular shoulder 540 facing the open end of the housing 511. The table 515 also consists of a metal pressing of part-spherical shape having a centrally formed depression 530 in the convex surface.

The sleeve of the previously described construction is replaced by a pair of members. A first member 532 of the pair is a cup-shaped sleeve formed as a metal pressing and having a flange 533. The flange has a bevelled edge 534.

The second member 535 of the pair is an annular metal pressing having central aperture 536 and an arcuately inturned marginal edge 537.

In assembly, a first mass of bearings balls is loaded in the housing 511 followed by the table 515 which is located with the dimple 531 seating in the depression 530. Further bearing balls 516 are then loaded onto the table 515 followed by the annular member 535. The inturned marginal edge 537 of the second member 535 seats on the annular shoulder 540 and the main ball 517 and the annular member 535 together form a lower defining wall of the bearing ball circulating chamber.

The main ball 517 is rotated to automatically distribute the bearing balls into upper layer 523 and lower layer 524 in the FIGURE 5 configuration.

The main ball 517 seats on a beveled edge 534 of the flange 533 of sleeve 532, and the opposite end of the sleeve 532 abuts the annular member 535 so that the latter is trapped between the sleeve 532 and the shoulder 540 and is thereby prevented from moving relative to the bearing balls 516. The annular member serves to prevent entry of balls into the sleeve. The end portion of the cylindrical part 512 of the housing 511 is spun so as to positively engage with the sleeve 532.

All the parts of this construction, except for the balls, are metal pressings so that the ball-castor can be particularly cheaply manufactured whilst being strong in that under heavy loading in any direction, the table 515 will be caused to rock or/and move laterally within the housing 511 so that the likelihood of any component breaking or being deformed is reduced.

I claim:

1. In a ball castor comprising a cup-shaped housing having a base, a main ball rotatably received and retained in the housing and projecting outward of the housing to engage a supporting surface, a multiplicity of bearing balls disposed in a chamber defined by the main ball and the housing base, the bearing balls having a diameter smaller than that of the main ball, and a freely floating table dividing the bearing balls into two layers, the improvement of the table being of an area smaller than the interior of the housing and circumferentially spaced therefrom a distance at least equal to the diameter of the bearing balls to permit free circulation thereof in the chamber from one of said layers to the other.

2. In the ball castor of claim 1, the housing base being of concave interior configuration and the table being of part-spherical configuration substantially conforming to that of the housing base, facing central portions of the housing base and the table being flattened to trap therebetween a plurality of said bearing balls and thereby to limit the lateral movement of the table relative to the housing.

3. A ball-castor comprising a generally cup-shaped housing, a dimple in the cup base extending to the interior of the housing, a main ball rotatably mounted in the housing and projecting out of the housing to engage with a supporting surface, a mass of smaller bearing balls disposed between the main ball and the cup base of the housing, and a table of part-spherical shape having convex and concave opposite surfaces disposed between the cup base of the housing and the main ball with the convex surface nearer to the cup base so as to divide the mass of bearing balls into susbtantially two layers, the convex surface of the table having a depression wherein is located the dimple, the depression being larger than the dimple to permit lateral movement of the latter, and the table being spaced at all other points on its surfaces from the housing and from the main ball by the bearing balls so as to be freely floating to permit lateral movement of the table relative to the housing limited by the extent of permitted lateral movement of the dimple within the depression.

4. A ball-castor according to claim 3, comprising a cup-shaped sleeve receiving the main ball and being secured within the housing, and an annular member encircling the main ball within the housing and seating on a rim of the cup-shaped sleeve, the annular member serving to confine the bearing balls to the housing and to restrain the bearing balls from entering the sleeve.

References Cited

UNITED STATES PATENTS 811,467    1/1906    Wolfe et al. _____ 16—26

BOBBY R. GAY, *Primary Examiner.*

D. L. TROUTMAN, *Assistant Examiner.*